United States Patent [19]

Barker

[11] 4,170,222

[45] Oct. 9, 1979

[54] SOLAR HEAT COLLECTOR

[76] Inventor: Roy D. Barker, 5228 Lone Tree Dr., Loveland, Colo. 80537

[21] Appl. No.: 825,932

[22] Filed: Aug. 19, 1977

[51] Int. Cl.² .................................................. F24J 3/02
[52] U.S. Cl. ...................................... 126/420; 126/450
[58] Field of Search ................. 126/270, 271; 237/1 A

[56] References Cited

U.S. PATENT DOCUMENTS

| 3,022,781 | 2/1962 | Andrassy | 126/271 |
| 3,859,980 | 1/1975 | Crawford | 126/271 |
| 3,910,253 | 10/1975 | Thomason et al. | 126/271 |
| 4,047,518 | 9/1977 | Anderson | 126/271 |
| 4,080,955 | 3/1978 | Sandstrom | 126/271 |

*Primary Examiner*—Kenneth W. Sprague
*Attorney, Agent, or Firm*—Michael L. Sherrard

[57] ABSTRACT

A solar heat collector constructed from transparent material utilizes a circulating absorptive fluid medium to collect solar energy. The collector comprises a plurality of cascaded fluid reservoirs, each reservoir having a self-draining feature active during a stagnant condition.

6 Claims, 4 Drawing Figures

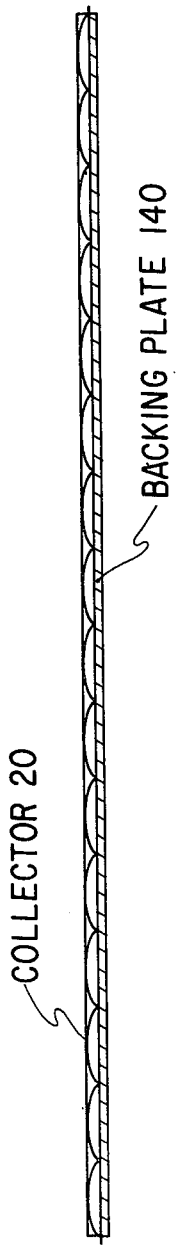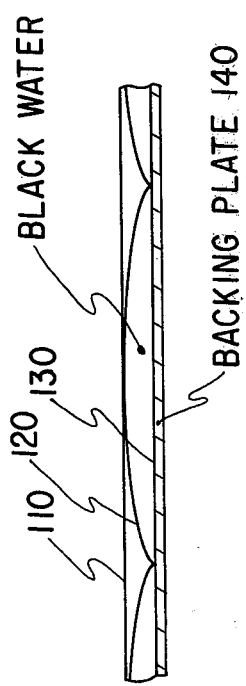

SOLAR HEAT COLLECTOR

BACKGROUND AND SUMMARY

Solar heat collectors typically incorporate a collector, a circulating fluid medium, and a means for transfering heat from the collector to the circulating fluid medium. These collectors are characterized by three deficiencies. First, efficiency is low because of the necessity of a heat exchanger to transfer heat from the collector to the circulating fluid medium. Second, heat exchangers typically involve complex manifolding and fluid circulation paths which result in undesirably high operating pressures within the heat exchanger. Third, the collectors operate at high temperatures, and in the event of a circulation failure, even higher stagnation temperatures. The high pressure and high temperature characteristics of prior art solar heat collectors require the use of expensive materials and construction techniques to produce collectors capable of withstanding the high pressure and temperature conditions.

The present invention eliminates the need for a heat exchanger in the solar heat collector by utilizing a circulating absorptive fluid medium to absorb solar energy directly. A cascaded reservoir arrangement permits the collector to efficiently capture the energy impinging the surface area of the collector while simultaneously requiring only a minimal fluid pressure within the collector. The transparent reservoirs operate at a temperature no higher than that of the circulating fluid, and a self-draining feature is active during a stagnant conditon so that in the event of a circulation failure the absorptive fluid medium automatically drains from the collector leaving the collector non-absorptive, and thus with a low stagnation temperature. These characteristics of the present invention allow for the use of inexpensive materials and construction techniques in the construction of durable solar heat collectors.

DESCRIPTION OF THE DRAWINGS

FIG. 2 is a side view of the preferred embodiment of FIG. 1.

FIG. 3 is an expanded detail of the side view of FIG. 2.

DETAILED DESCRIPTION

Figure 1:
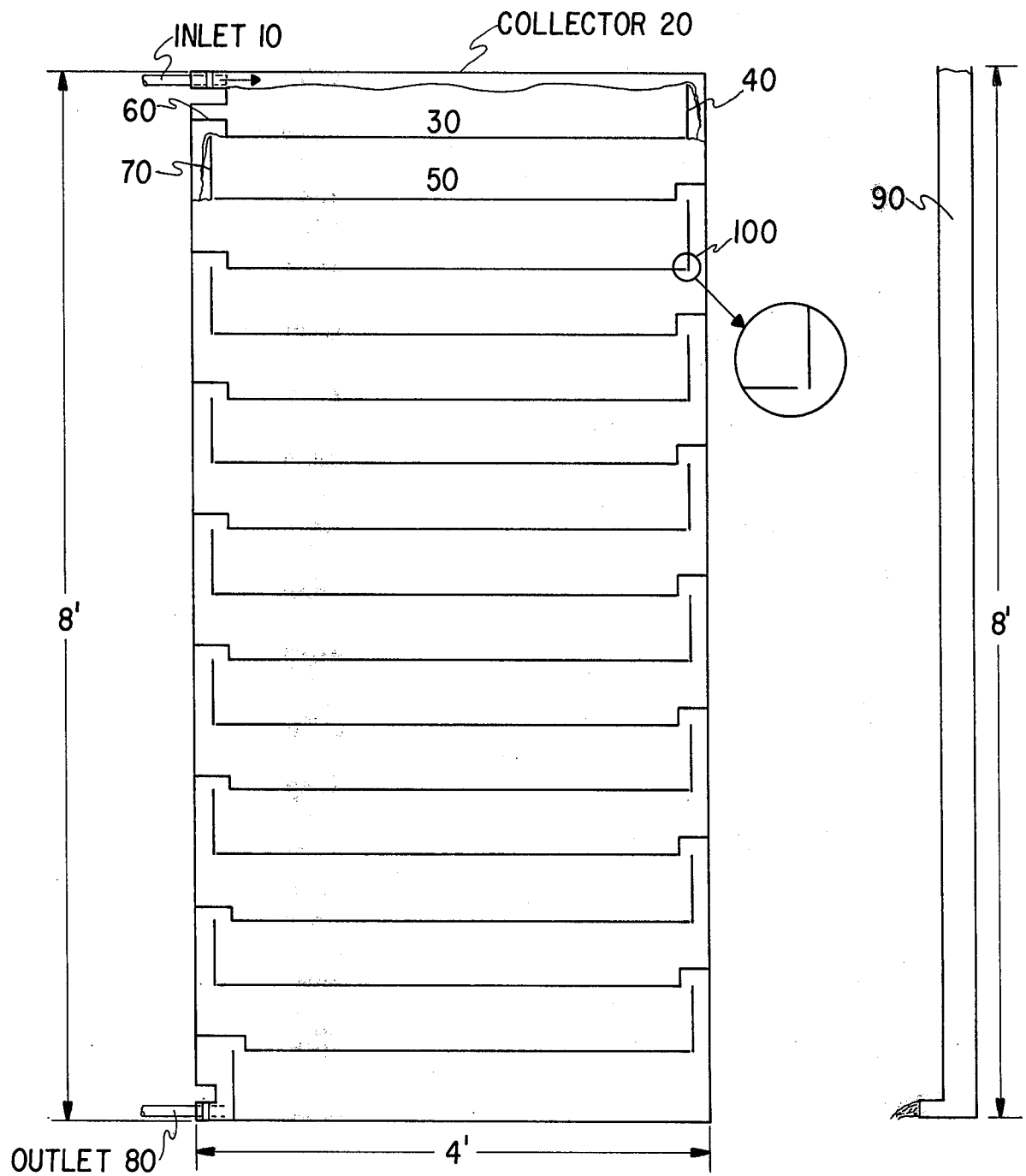
FIG. 1 is a detailed illustration of the preferred embodiment of the present invention.

A detailed illustration of the preferred embodiment of the present invention is given in FIG. 1. An absorptive fluid medium, such as water having 120 drops/liter of india ink, is introduced to the collector 20 via inlet 10. The fluid is retained in reservoir 30 by a dam 40 until the fluid level reaches the top of the dam 40, whereupon the fluid cascades into reservoir 50. A shoulder 60 in the reservoir 30 permits the dam 70 of reservoir 50 to be as high as or higher than the upper limit of reservoir 50. This permits the reservoir 50 to fill completely with absorptive fluid and results in a very high percentage of the surface area of collector 20 being absorptive to solar energy when filled with fluid. The fluid cascades through reservoirs of collector 20 to outlet 80. As is evident from the illustration, the fluid pressures at the input, within the collector 20, and at the output, are very small as compared to the pressure P of column 90, having the same height and vertical disposition. This results from the fluid freely cascading from a first reservoir, over a dam, to a second reservoir. The potential energy of the fluid is then converted to heat and a desirable mixing of the fluid within the reservoirs. This feature requires that the operating rate of circulation be such that air pockets remain proximate to the dam and shoulder areas of each reservoir.

Each reservoir also incorporates a stagnation drainage means, such as the drain 100 in FIG. 1. In the present invention this is merely a small intentional leak incorporated into the base of each reservoir. At operational circulation rates the leakage does not interfere with the circulation or fluid pressures of the collector. However, in the event of a circulation failure the drains will slowly allow the absorptive fluid medium to drain completely from the collector 20. Removing the circulating absorptive fluid results in a transparent collector characterized by a low stagnation temperature.

The low temperature and pressure characteristics of the present invention allow the use of inexpensive materials and methods in the construction of the collector. The preferred embodiment is constructed of 4 mil polyvinylflouride, available from DuPont under the TEDLAR Trademark. FIGS. 2 and 3 illustrate a side view of the present invention. A first sheet of TEDLAR 120 is laid over second sheet of TEDLAR 130, and the sheets are heat bonded together along the lines shown in FIG. 1. A cover sheet 110 provides additional insulation for the heat captured by the reservoirs, and the entire collector can be bonded to backing plate 140 to stabilize the collector or simply rolled out on an existing structure such as a roof.

Figure 4:
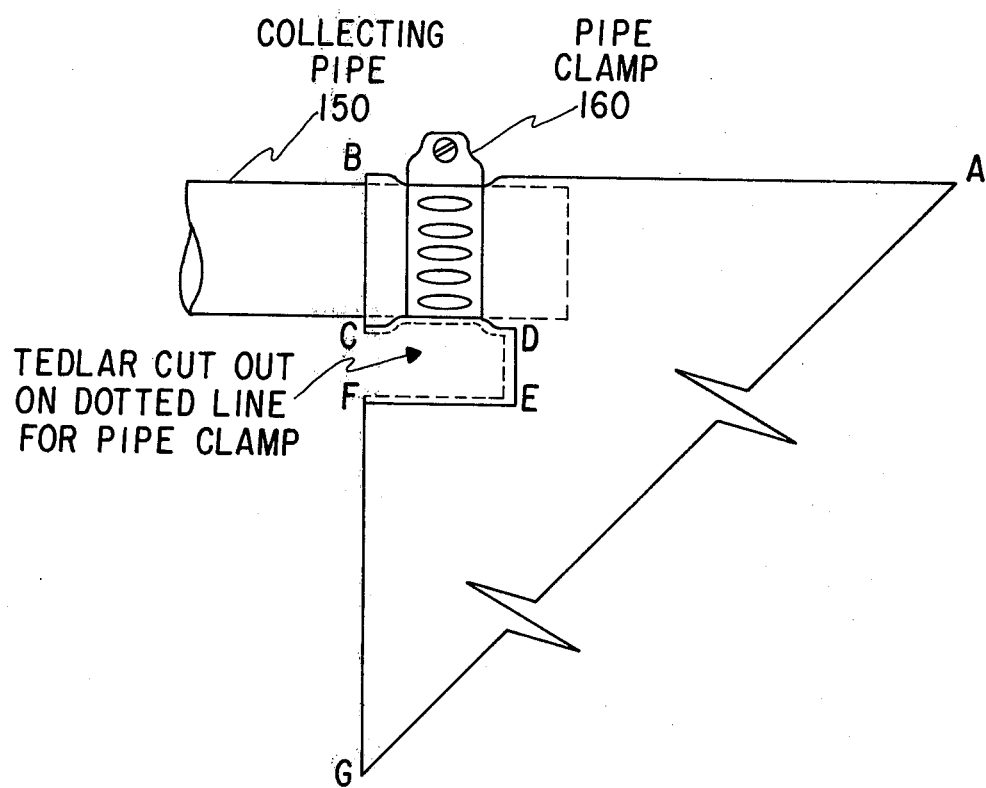
FIG. 4 illustrates the details of the inlet and outlet of the preferred embodiment of FIG. 1.

FIG. 4 illustrates the details of the attachment technique used for inlet 10 and outlet 80. The sheets of TEDLAR are heat bonded along lines AB and CDEFG. The rectangle defined by CDEF is cut out, a connection pipe 150 inserted in the inlet between the sheets 120 and 130, between points B and C, and a pipe clamp 160 is used to secure the sheets 120 and 130 to the pipe 150 as shown.

The present invention is characterized by an operating temperature of about 140° F., at the preferred circulation rate and by an even lower stagnation temperature. The independent cascading reservoir arrangement results in a small internal operating pressure and the uniform reservoir sizes result in an even distribution of the weight of the circulation fluid over the collector.

I claim:

1. A solar heat collector comprising:
   input means for receiving a fluid;
   first reservoir means constructed from a flexible plastic material coupled to said input means for retaining a volume of the fluid therein, said first reservoir means being transparent to solar radiation;
   first means for removing fluid from said first reservoir means in response to the level of the fluid retained by said first reservoir means exceeding a predetermined height;
   first drain means for continuously removing fluid from the base of said first reservoir means, said first drain means having a flow capacity smaller than either the flow capacity of said input means or of said first means;
   second reservoir means constructed from a flexible plastic material for receiving fluid from said first means for retaining a volume of fluid therein, said second reservoir means being transparent to solar radiation and positioned to retain fluid at an elevation lower than that retained by said first reservoir means;

second means for removing fluid from said second reservoir means in response to the level of the fluid retained by said second reservoir means exceeding a predetermined height; and second drain means for continuously removing fluid from the base of said second reservoir means, said second drain means having a flow capacity smaller than the flow capacity of said input means or of said second means.

2. A solar heat collector as in claim 1 wherein an absorptive fluid is circulated therethrough.

3. A solar heat collector comprising;

a first ply of waterproof, transparent plastic material;

a second ply of waterproof, transparent plastic material disposed proximate to a first surface of said first ply, said plys bonded at the edges, said plys bonded at a first set of parallel horizontal bonds extending from a first edge of said plys to first positions proximate to a second edge; said plys bonded at a second set of parallel horizontal bonds extending from the second edge of said plys to second positions proximate to the first edge, the second set of lines alternating vertically with the first set; a third set of bonds extending vertically from first and second positions to third positions proximate to the bonds disposed vertically above said first and second positions;

means for introducing a fluid into the reservoir defined by the top edge and by the topmost of said horizontal lines;

means for removing a fluid from the reservoir defined by the bottom-most edge and the horizontal bond disposed vertically above it; and drain means for providing a limited flow of fluid through each of said first and second sets of parallel horizontal bonds.

4. A solar heat collector as in claim 3 further comprising a third ply of transparent plastic material disposed proximate to said second ply, said ply bonded to said second ply at the edges.

5. A solar heat collector as in claim 3 wherein the first and second sets of horizontal bonds have shoulder means disposed vertically above third positons, each of said shoulder means comprising a section of a horizontal line elevated relative to the rest of the horizontal line, each of the third set of bonds extending to an elevation above the non-elevated portion of the respective horizontal line disposed thereabove for permitting each reservoir to fill to the horizontal line defining the upper most boundary of the respective reservoir.

6. A solar heat collector as in claim 1 wherein said first drain means is operatively coupled to said second reservoir means for continuously conducting fluid removed from said first reservoir means to said second reservoir means.

* * * * *